(12) United States Patent
Buch et al.

(10) Patent No.: US 6,748,512 B2
(45) Date of Patent: Jun. 8, 2004

(54) METHOD AND APPARATUS FOR MAPPING ADDRESS SPACE OF INTEGRATED PROGRAMMABLE DEVICES WITHIN HOST SYSTEM MEMORY

(75) Inventors: Deep Buch, Folsom, CA (US); Varghese George, Folsom, CA (US); Vladimir Pentkovski, Folsom, CA (US); Paul Zagacki, Citrus Heights, CA (US); Edward Gamsaragan, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 149 days.

(21) Appl. No.: 09/733,875

(22) Filed: Dec. 8, 2000

(65) Prior Publication Data

US 2002/0073296 A1 Jun. 13, 2002

(51) Int. Cl.[7] .............................................. G06F 12/08
(52) U.S. Cl. ...................................................... 711/202
(58) Field of Search ................................ 711/202, 203, 711/206, 207

(56) References Cited

U.S. PATENT DOCUMENTS

| | | | | |
|---|---|---|---|---|
| 5,905,509 A | * | 5/1999 | Jones et al. | 345/520 |
| 5,949,436 A | | 9/1999 | Horan et al. | |
| 5,999,198 A | | 12/1999 | Horan et al. | |
| 5,999,743 A | | 12/1999 | Horan et al. | |
| 6,069,638 A | | 5/2000 | Porterfield | |
| 6,279,087 B1 | * | 8/2001 | Melo et al. | 711/146 |
| 6,457,068 B1 | * | 9/2002 | Nayyar et al. | 710/3 |
| 6,462,745 B1 | * | 10/2002 | Behrbaum et al. | 345/543 |

OTHER PUBLICATIONS

Intel Corporation, "Accelerated Graphics Port (AGP) Interface Specification," Revision 2.0, May 4, 1998, pp. 1–2; 23–29.

* cited by examiner

Primary Examiner—Kevin L. Ellis
(74) Attorney, Agent, or Firm—Blakely, Sokoloff, Taylor & Zafman LLP

(57) ABSTRACT

A Method and Apparatus for Mapping Address Space of Integrated Programmable Devices within Host System Memory is described herein.

37 Claims, 7 Drawing Sheets

METHOD AND APPARATUS FOR MAPPING ADDRESS SPACE OF INTEGRATED PROGRAMMABLE DEVICES WITHIN HOST SYSTEM MEMORY

FIELD OF THE INVENTION

The present disclosure pertains to the field of computer system integration. More particularly, the present disclosure pertains to the field of using system memory for the allocation of a device address range of a programmable device.

BACKGROUND

In order to satisfy the conflicting design constraints of driving cost and power lower while continuing to increase performance in today's computer systems, designers have relied on a number of different methods, including the integration of discrete system components into a core-logic chipset and/or microprocessor.

Device integration has been largely limited to the area of Accelerated Graphics Port (AGP) graphics. Computer systems are available today containing core-logic chipsets containing integrated AGP graphics devices designed to operate at lower power, lower cost, and higher performance than some computer systems containing discrete AGP graphics devices. Moreover, recent advancements in computer system component integration has spawned the integration of AGP graphics within a microprocessor.

In order to continue to lower cost and power, while continuing to increase performance, both approaches rely on system memory for at least some of the integrated device's memory needs. In the area of AGP graphics, for example, system cost and power consumption are driven lower by using system memory for storage of command, data, and texture maps and alleviating the need for costly, power-consuming local graphics memory. In order for the graphics device to map at least a portion of its device memory range to system memory, the graphics driver must request an allocation of system memory from the host operating system. Due to the non-contiguous manner in which the operating system may allocate the requested device memory within system memory, it is further necessary to create a table or 'map' that translates linear addresses originating from the graphics device to the actual physical address locations allocated within system memory by the operating system. This is accomplished in the area of integrated AGP graphics through a Graphics Address Re-mapping Translation Table (GART).

Previous methods of re-mapping integrated device address space to system memory have been limited in the number devices that may share an address re-mapping table. Furthermore, these methods are limited in the types of devices that may re-map device address space to system memory. For example, GART may only be accessed by AGP devices.

These limitations severely reduce the number of devices and the device types that may be integrated within a chipset or microprocessor without resorting to external memory solutions. Therefore, cost and power advantages associated with integrating non-AGP devices within a chipset or microprocessor may not be fully realized.

DETAILED DESCRIPTION

The present disclosure provides a method and apparatus for mapping address space of at least one integrated programmable device to system memory within a computer system. In this disclosure, an integrated programmable device includes any integrated circuit that executes instructions derived from a software program to perform functions contained within those instructions. The term "mapping" includes a translation operation of an address originating from an integrated programmable device to a physical memory address contained within system memory.

The following describes several embodiments. However, one of ordinary skill in the art would appreciate that the scope is not limited to the embodiments described herein.

Figure 1:
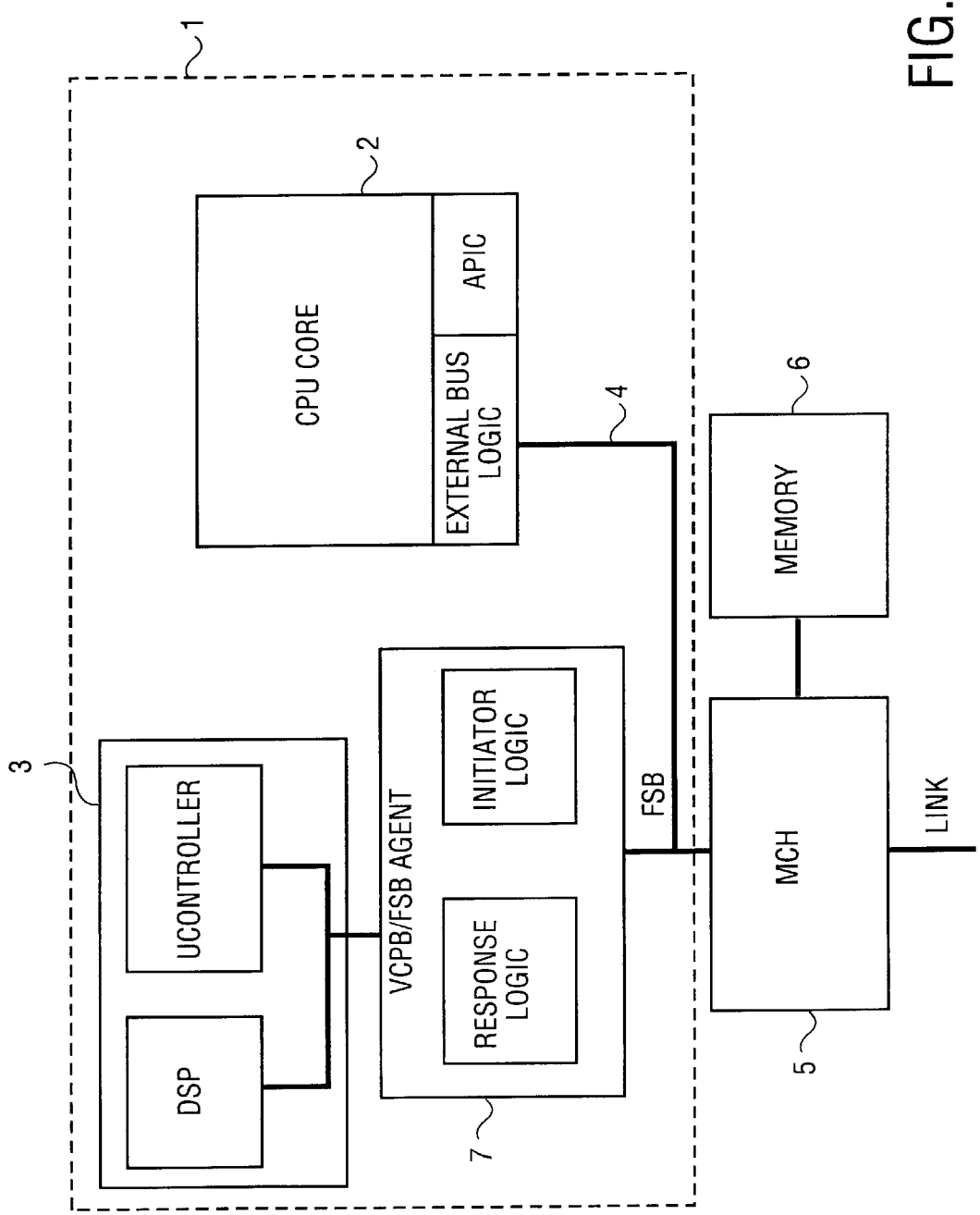
FIG. 1 illustrates a system to implement one embodiment

FIG. 1 is a block diagram of a computer system in which one embodiment may be used, including a microprocessor 1, a memory controller hub (MCH) 5, and a memory subsystem 6. The computer system of FIG. 1 further comprises a microprocessor 1 consisting of a CPU core 2, a programmable integrated co-processor 3, and a Virtual PCI-to-PCI Bridge Circuit (VPBC) 7 coupled with the MCH via a host Front Side Bus (FSB) 4.

The VPBC acts as a translator between local bus cycles on one side of the VPBC and PCI bus cycles on the other side. In one embodiment, the VPBC is responsible for translating local bus cycles originating from a CPU core into PCI bus cycles to be fed to an integrated programmable co-processor. Likewise, the VPBC translates PCI bus cycles originating from an integrated programmable co-processor into local bus cycles intended for a CPU or external bus agent, such as an MCH. The VPBC also contains registers containing PCI configuration information pertaining to the integrated programmable co-processor. In one embodiment, these configuration registers contain the secondary and subordinate bus numbers, the I/O base and limit, memory base and limit, and a command register corresponding to the integrated co-processor. Therefore, the VPBC can detect when an address originating from a local bus agent, such as the CPU core, is intended for the integrated co-processor and respond accordingly. Various responses by the VPBC are described in further detail later in this specification.

The integrated co-processor of FIG. 1, in one embodiment, is a communications processor. However, one of skill in the art would appreciate that the scope is not limited to mapping device address space of a communications processor to system memory, nor is the present invention limited to devices integrated within the microprocessor substrate.

Figure 2:
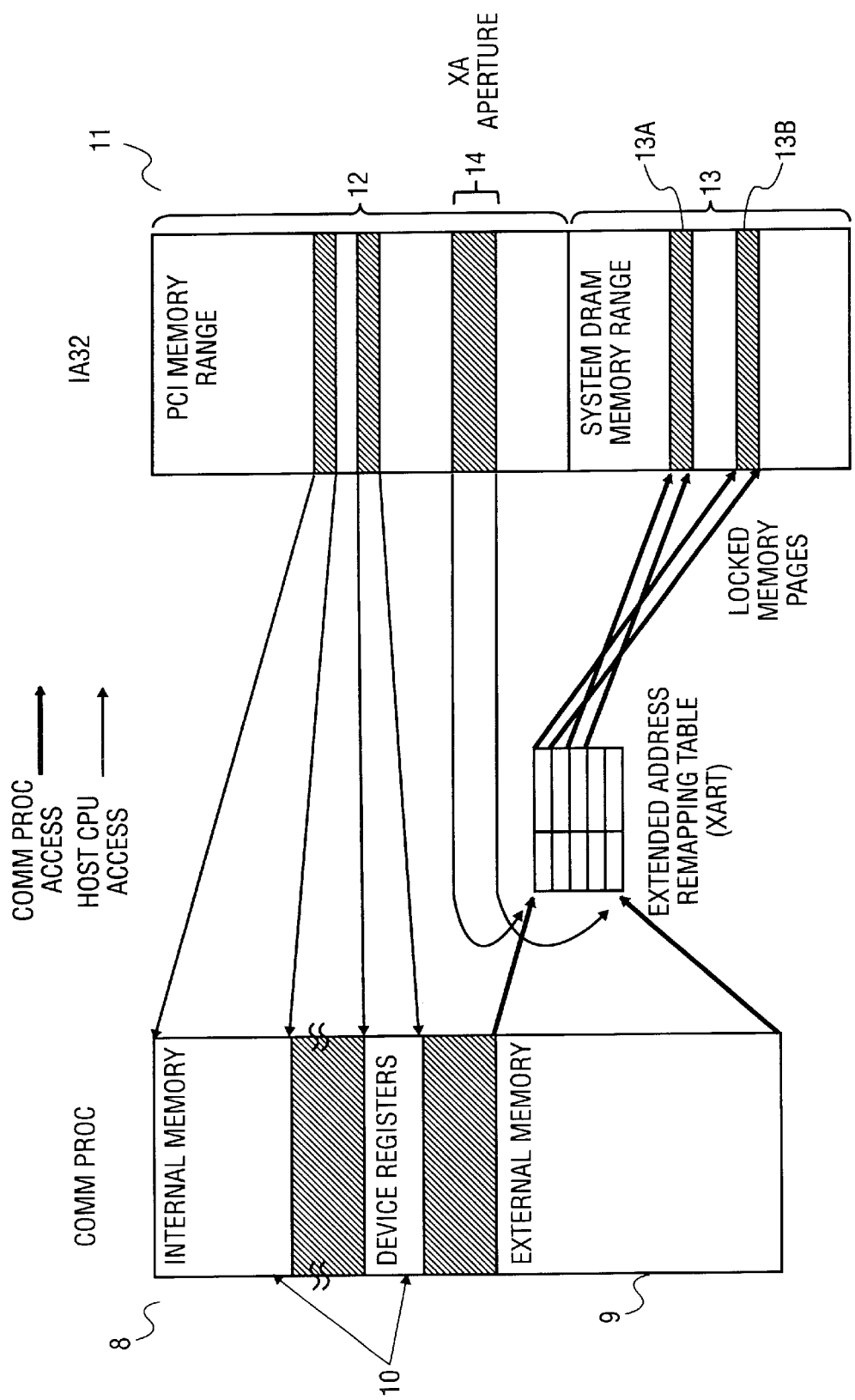
FIG. 2 illustrates the mapping of a communication processor's device memory range to system memory in accordance with one embodiment.

FIG. 2 illustrates a memory map of the device address space 8 of an integrated communications processor within the IA32 device address range 11 of system memory. The IA32 device address range 11 corresponds to the address range of a Intel Architecture 32-bit processor. In one embodiment of the present invention, the communications processor's external memory 9 is mapped into the system Dynamic Random Access Memory (DRAM) range 13 of the IA32 device address space 11 via an Extended Address Re-mapping Table (XART) 15. XART 15 is a table whose entries include linear addresses corresponding to the communications processor's externally addressable memory 9 and the associated physical addresses 13a and 13b within system memory to which they are mapped. The physical memory addresses 13a and 13b within system memory are allocated at boot time by a host operating system and are not necessarily arranged contiguously in memory. Therefore, in order for an integrated programmable device, such as the communications processor 3 of FIG. 1 to linearly address external memory allocated within the system DRAM memory range 13, a re-mapping table, such as XART 15 in FIG. 2, may be used.

The remainder of the communications processor's address space 8 is dedicated to internally addressable memory and device registers 10. This memory is allocated at boot by standard Peripheral Component Interconnect (PCI) enumeration and allocation methods within the PCI memory range 12 of the IA32 host memory 11. Also allocated within the PCI memory range 12 is an extended aperture 14, which is used by a host CPU to access external memory 9 mapped by the XART 15 to the system DRAM range 13. In one embodiment that incorporates this extended aperture, the host CPU need only provide a PCI address in order to access the communications processor's external memory.

Figure 3:
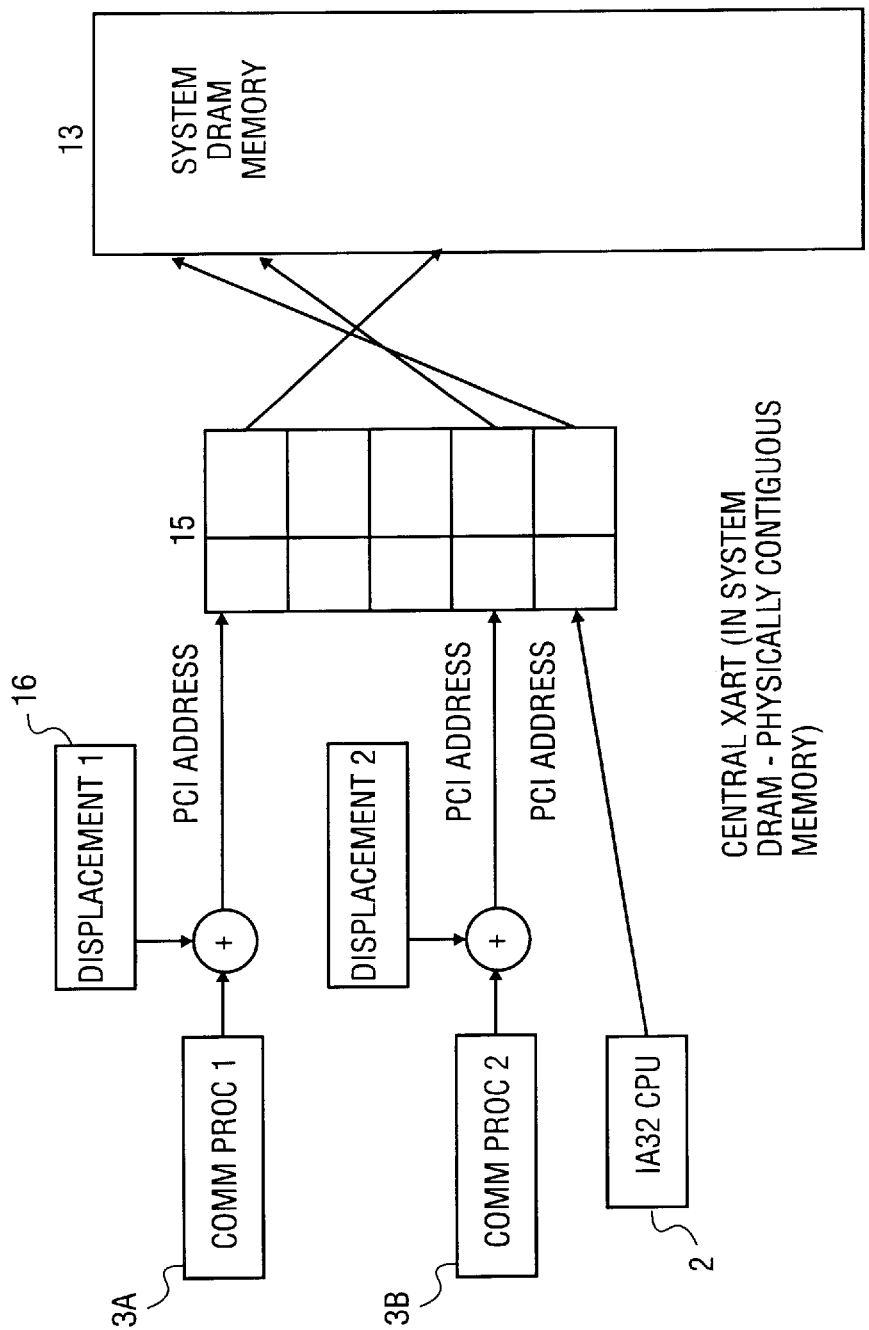
FIG. 3 illustrates one embodiment in which a plurality of communications processors are accessing system DRAM memory via a centrally-located XART.

FIG. 3 illustrates one embodiment in which a XART 15 is centrally located within system memory, thereby allowing a plurality of communications processors 3a and 3b as well as a host CPU 2 to allocate their respective device address range within system memory. In such an embodiment, the first communications processor 3a maps external memory into system memory using XART 15 by the addition of a displacement address 16 to the base address of the XART 15. Likewise, the second communications processor 3b maps external memory into system memory using XART 15 by the addition of a displacement address 17 to the base address of the XART 15. In this way, a plurality of integrated programmable devices may map a portion of address space into system memory using one XART 15. Furthermore, other devices, such as the host CPU 2, may access the address space of a plurality of programmable devices stored within system memory via the centrally located XART by first addressing an extended aperture FIG. 2, 14 as previously mentioned. External memory, as described in this specification, refers to the portion of a device's address range of memory residing off-chip. Although, the described embodiment refers to mapping external memory to system memory, it would be appreciated by one of ordinary skill in the art that internal memory—a device's address range of memory residing on-chip—could also be mapped to system memory in accordance with the present invention.

Figure 4:
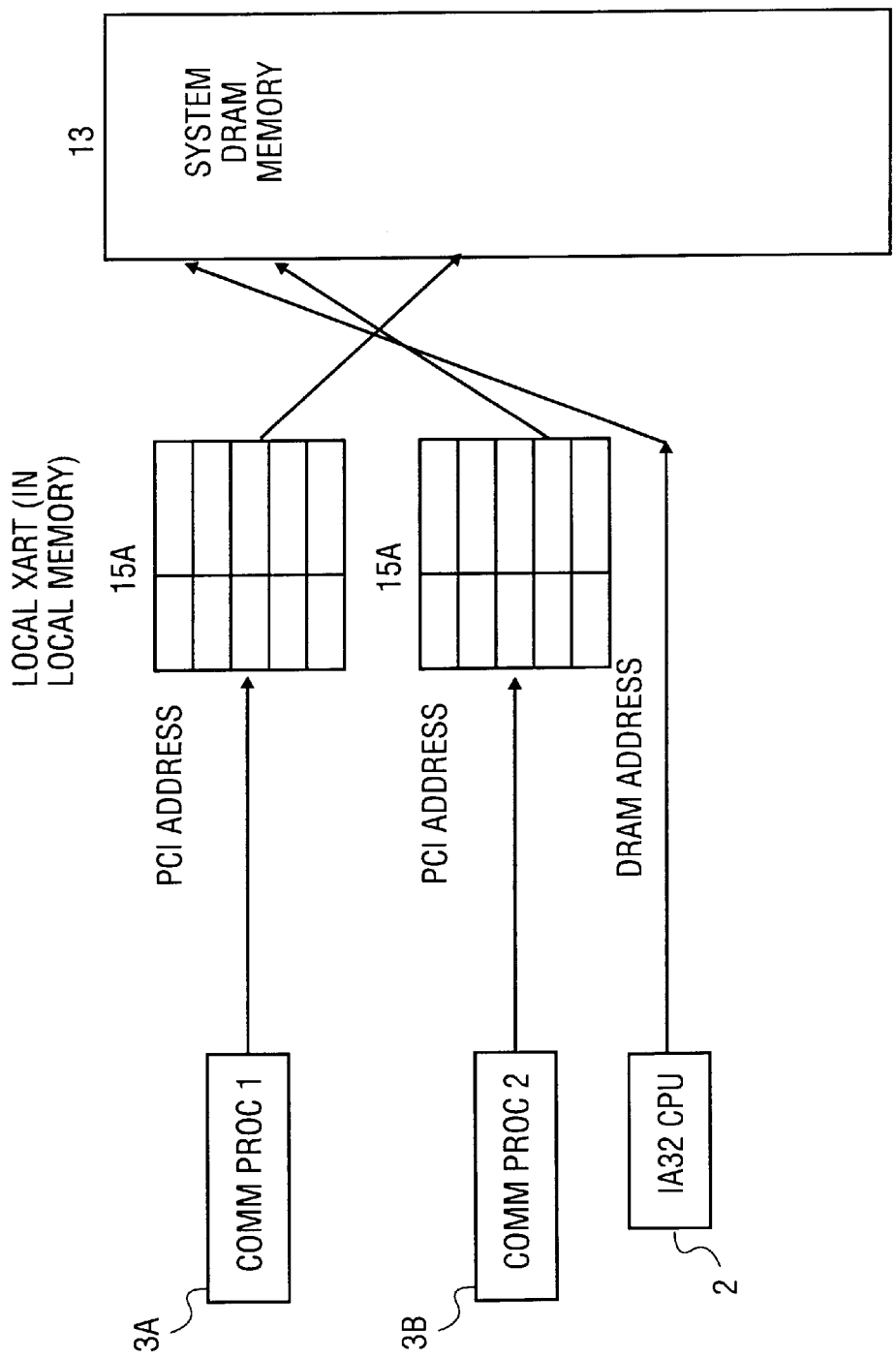
FIG. 4 illustrates one embodiment in which a plurality of communications processors are accessing system DRAM memory via a locally-located XART.

FIG. 4 illustrates another embodiment of the present invention in which a XART 15a and 15b is located within the local memory of the integrated programmable device 3a and 3b by which it is used. For example, a first communications processor 3a accesses a portion of its device address space mapped within system DRAM memory 13 by providing a PCI address to the local XART 15a stored within the local memory of the communications processor. Similarly, a second communications processor 3b accesses a portion of its device address space stored within system DRAM memory 13 by providing a PCI address to its local XART 15b stored within the local memory of the communications processor. However, unlike the previous embodiment, other devices, such as the host CPU 2, cannot access the address space of either communications processor via XART 15a and 15b.

Figure 5:
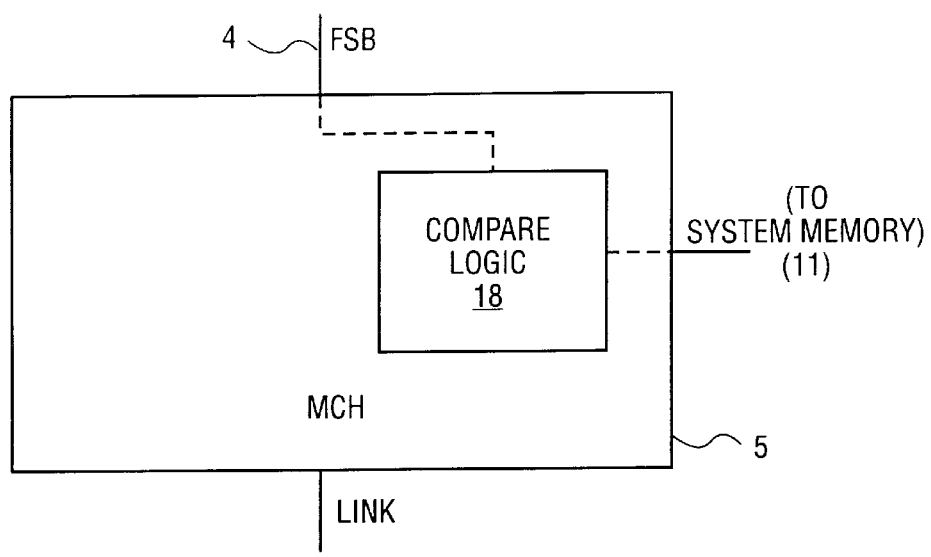
FIG. 5 illustrates the address compare logic within a memory controller hub (MCH) used in one embodiment to determine whether memory accesses fall within the system memory address range mapped by XART.

FIG. 5 illustrates an address compare circuit 18 within a bridge device, such as a memory controller hub (MCH) 5 used in one embodiment in which the XART is centrally located within system memory. In the case of a local XART, the address compare logic would be included within the programmable device whose address space is being mapped to system memory by the local XART. In the former case, PCI addresses originating from devices residing on the front side bus (FSB) 4, such as a communications processor or CPU are compared with a range of addresses mapped by a XART by the compare logic 18. If the PCI address is within the range mapped by the XART, then the MCH 5 asserts the linear address to system memory corresponding to that XART entry stored within system memory. The physical system memory address mapped by XART corresponding to the asserted linear address is returned by system memory to the MCH, which then asserts the physical address to system memory to retrieve the actual data requested by the FSB agent. The data is then returned to the requesting agent via the FSB 4. Although FIG. 5 illustrates memory accesses being made by devices residing on the FSB 4, other embodiments are not limited to requests by FSB agents.

Figure 6:
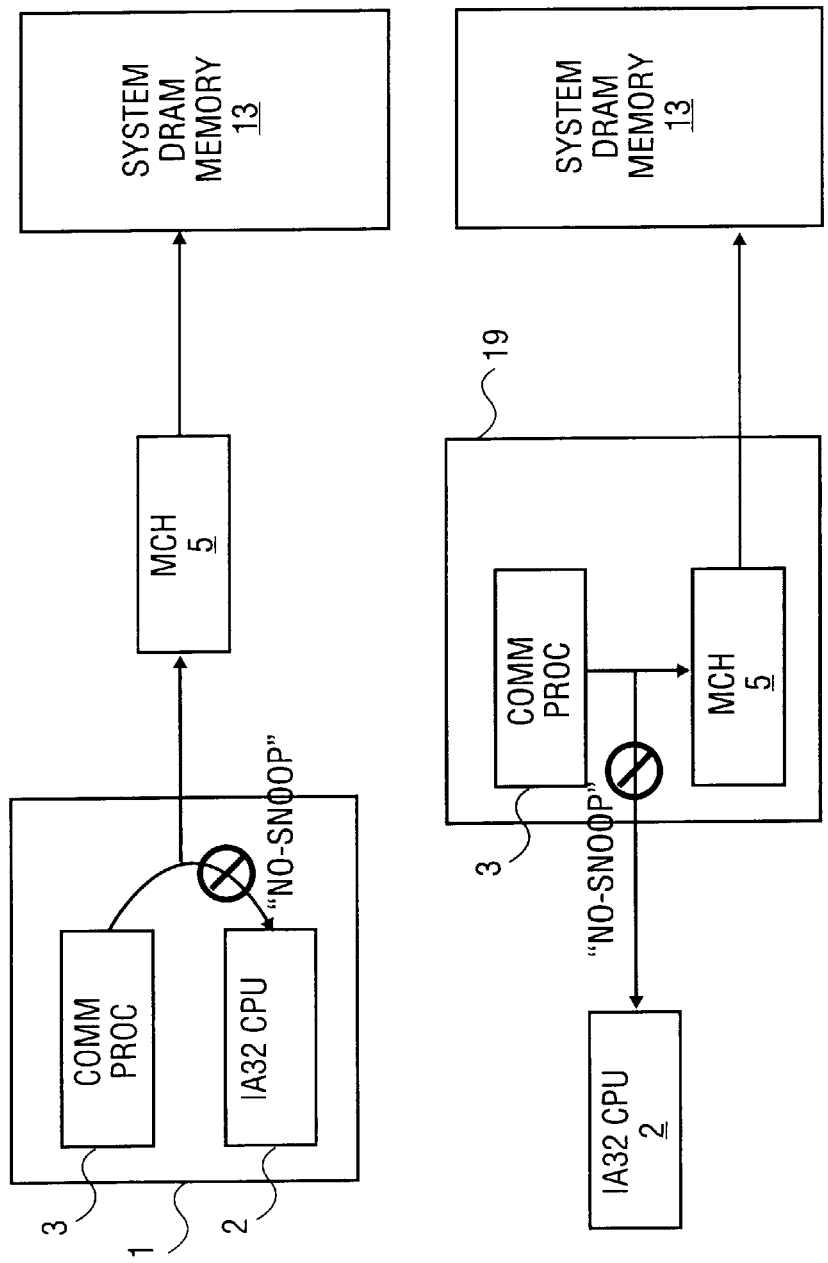
FIG. 6 illustrates two embodiments in which CPU cache coherency is maintained.

FIG. 6 illustrates two embodiments in which a snoop prevention method is implemented for two programmable device integration options. A snoop prevention method is described in order to allow a CPU residing on the same local bus on which memory requests are driven by an integrated programmable device to maintain coherency within CPU cache. In the first option, a programmable device, such as a communications processor 3, is integrated within the same substrate 1 as an CPU core 2. In this embodiment, the CPU core is prevented from snooping bus accesses originating from the communications processor. This prevents the performance degradation that would result from the CPU snooping its cache during accesses made by the communications processor.

In another embodiment shown in FIG. 6, a programmable device, such as a communications processor 3 is integrated within the same substrate 19 as a bridge device, such as an MCH 5. In this embodiment as in the previous one, memory accesses originating from the communications processor are prevented from being snooped by the CPU 2. In this manner, performance bottlenecks that would result from the CPU snooping communications processor memory accesses are avoided. Either embodiment may be implemented one of two ways.

In the address-based implementation, memory accesses driven onto the CPU local bus by an integrated programmable device, such as a communications processor, are detected by the CPU. Subsequently, the CPU determines whether the target address associated with the memory access is within the device address range of the integrated programmable device. If so, the CPU does not perform a cache snoop. In one embodiment, logic within a local bus cluster within the CPU 2 decodes addresses originating from a communications processor integrated within a microprocessor, thus preventing the microprocessor from snooping bus cycles originating from the communications processor. In another embodiment logic within an MCH 5 decodes addresses originating from a communications processor integrated within the MCH 5 and subsequently prevents the CPU 2 from snooping the cycle.

In the geography-based implementation, a CPU determines whether to perform a cache snoop in response to a memory access asserted on the CPU local bus by determining from where in the system the memory access originated. This implementation depends upon whether a programmable device is integrated within a microprocessor or a bridge device, such as an MCH.

In the case of a programmable integrated device being integrated within a microprocessor substrate along with a CPU core, the programmable device bus agent responsible for driving the CPU local bus with a memory access also indicates to the CPU whether it should snoop the transaction. For example, in the case of a communications processor integrated within a microprocessor substrate 1 along with an CPU 2 core, a virtual PCI-to-PCI bridge circuit (VCPB) 7 asserts a signal on the FSB 4 indicating that the bus cycle is originating from the communications processor. In some embodiments, extra logic within the CPU bus controller is not needed, and less overhead is required for the CPU to determine the origin of the bus cycle.

In the case of a programmable integrated device being integrated within a bridge device, such as an MCH, the some embodiments use existing control logic within the bridge device to prevent PCI addresses from appearing on the CPU local bus. Therefore, in this embodiment, the CPU is not "aware" of memory accesses originating from the integrated programmable device. For example, accesses to system memory made by a communications processor integrated within an MCH can be prevented from appearing on the local bus by configuring the communications processor such that memory requests are not forwarded to the Input/Output Queue (IOQ) of the MCH. Typically, memory accesses made by PCI devices are forwarded by the IOQ onto the local bus in IA32-based computer systems, thus causing the CPU to perform a cache snoop. These snoops are avoided in one embodiment of the present invention by disallowing memory accesses made by the integrated communications processor from appearing on the local bus via IOQ.

Figure 7:
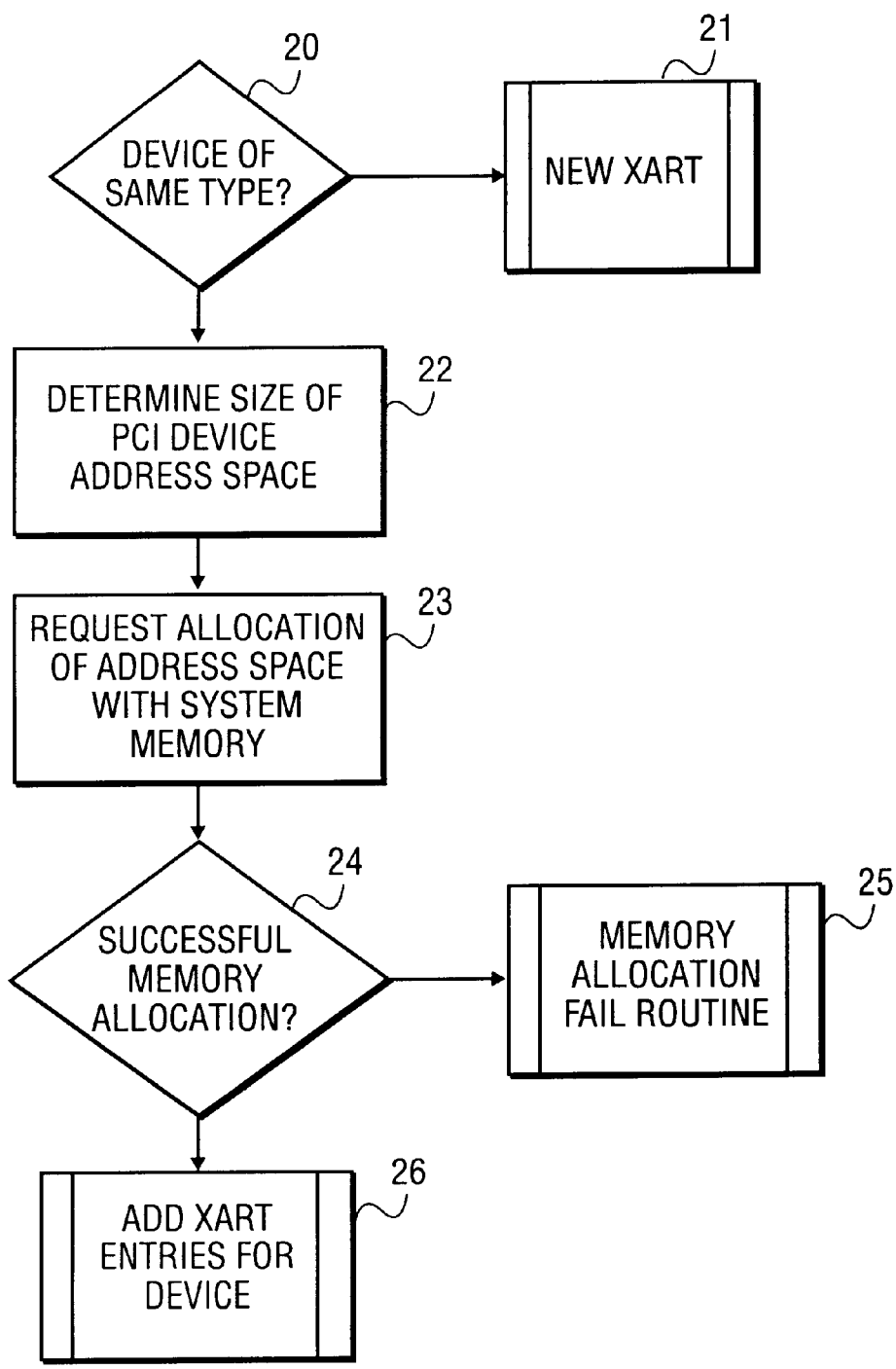
FIG. 7 illustrates a flow diagram illustrating one embodiment.

FIG. 7 illustrates one embodiment of a process by which the programmable device's address space is mapped within system memory. In the first step 20 of FIG. 7, a determination is made as to whether a detected device configured to use system memory for at least a portion of its device address space is of the same type as one for which an XART already exists. If the detected device is not of the same type as a previously mapped device or if the detected device is the first device detected to be configured to map its device address space into system memory, then a new XART is created. Otherwise, the device's address space is mapped into system memory by sharing an existing XART corresponding to a device of the same type by requesting an allocation of system memory from the operating system and subsequently adding an offset to the appropriate mapped entries with XART. For the purposes of the present invention, devices of the same type refers to the manner in range in which they are addressed. For example, in one embodiment, only PCI devices are able to map their address range to system memory.

In the next step 21 a request is made to the operating system for an allocation of a portion of system memory to which the device address space may be mapped. Depending on the availability of system memory, the operating system will either return virtual addresses of the allocated system memory requested or return a fail condition. In the former case, the driver of the requesting device will then obtain the physical addresses of the memory allocated by the operating system, which may or may not be contiguous in system memory. If the operating system returns a fail condition as a result of the request for an allocation of system memory, the driver of the requesting device will be responsible for handling this case gracefully by either informing the user of the condition or re-attempting the memory allocation.

Assuming that the operating system was able to allocate the requested system memory, an XART is created that maps the integrated programmable device's address space to the physical addresses allocated by the operating system. XART may also included cache containing the most frequently requested data in order to optimize performance for the accesses to system memory made by a device.

The method and apparatus disclosed herein may be integrated into advanced Internet- or network-based knowledge systems as related to information retrieval, information extraction, and question and answer systems. FIG. 1 is an example of one embodiment of a computer system. The system shown has a microprocessor 1 coupled to a bus 4. Also shown coupled to the bus are a memory 6 which may contain instructions. Additional components shown coupled to the bus is a MCH 5. Of course, an exemplary computer system could have more components than these or a subset of the components listed.

The method described above can be stored in the memory of a computer system (e.g., set top box, video recorders, etc.) as a set of instructions to be executed. In addition, the instructions to perform the method described above could alternatively be stored on other forms of machine-readable media, including magnetic and optical disks. For example, the method of the present invention could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the methods as discussed above, could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method Comprising:
   mapping at least one address originating from a programmable device within a computer system to a portion of system memory, said mapping using an Extended Address Re-mapping Table (XART);
   maintaining coherency within at least one CPU cache, said maintaining coherency comprising snooping only addresses not originating from said programmable device.

2. The method of claim 1 wherein said programmable device is configured as a PCI device.

3. The method of claim 2 wherein said programmable device is integrated within the same substrate as at least one CPU core.

4. The method of claim 3 wherein said programmable device is a communications processor.

5. The method of claim 4 wherein said XART is located within said portion of system memory.

6. The method of claim 5 wherein said portion of system memory is IA32 host.

7. The method of claim 4 wherein said XART is located within local memory, said local memory being used by said communications processor.

8. The method of claim 1 wherein said step of maintaining coherency within said at least one CPU cache comprises:
 snooping memory accesses originating from bus agents other than said programmable device, said snooping being performed by a CPU.

9. A method comprising:
 mapping at least one address originating from any of a plurality of programmable devices within a computer system to system memory, said mapping using an Extended Address Re-mapping Table (XART);
 maintaining coherency within at least one CPU cache, said maintaining coherency comprising snooping only addresses not originating from said any of a plurality of programmable devices.

10. The method of claim 9 wherein said any of a plurality of programmable devices are configured as a PCI device.

11. The method of claim 10 wherein said any of a plurality of programmable devices are integrated within the same substrate as said at least one CPU core.

12. The method of claim 11 wherein said any of a plurality of programmable devices are communications processors.

13. The method of claim 12 wherein said XART is located within said portion of system memory.

14. The method of claim 13 wherein said portion of system memory is IA32 host memory.

15. The method of claim 12 wherein said XART is located within local memory, said local memory being used by said communications processor.

16. The method of claim 9 wherein said maintaining coherency within said at least one CPU cache comprises:
 snooping memory access bus cycles originating from bus agents other than said any of a plurality of programmable devices, said snooping being performed by a CPU.

17. An apparatus comprising:
 a unit to map at least one address originating from any of a plurality of programmable devices within a computer system to system memory, said mapping using an Extended Address Re-mapping Table (XART);
 a unit to maintain coherency within at least one CPU cache, said
 maintaining coherency comprising snooping only addresses not originating from said any of a plurality of programmable devices.

18. The apparatus of claim 17 wherein said any of a plurality of programmable devices are configured as a PCI device.

19. The apparatus of claim 18 wherein said any of a plurality of programmable devices are integrated within the same substrate as said at least one CPU core.

20. The apparatus of claim 19 wherein said any of a plurality of programmable devices are communications processors.

21. The apparatus of claim 20 wherein said XART is located within said portion of system memory.

22. The apparatus of claim 21 wherein said portion of system memory is IA32 host memory.

23. The apparatus of claim 20 wherein said XART is located within local memory, said local memory being used by said communications processor.

24. The apparatus of claim 17 wherein said unit to maintain coherency within said at least one CPU cache comprises:
 snooping memory access bus cycles originating from bus agents other than said any of a plurality of programmable devices, said snooping being performed by a CPU.

25. A system comprising:
 at least one microprocessor, said microprocessor comprising at least one CPU core, at least one virtual PCI-to-PCI bridge circuit (VPBC), and at least one co-processor coupled to said at least one CPU core by said at least one VPBC;
 at least one bridge coupled to said at least one microprocessor and said at least one VPBC;
 a system memory coupled to said at least one bridge;
 wherein said at least one co-processor is configured as a PCI device; and
 wherein said at least one VPBC, and said at least one co-processor are integrated within the same substrate as said at least one CPU core.

26. The system of claim 25 wherein said at least one co-processor is a communications processor.

27. The system of claim 26 wherein said at least one bridge comprises an address compare circuit, said address compare circuit being configured to determine whether an address originating from said at least one communications processor is within a range of addresses mapped to said system memory by an extended address translation table (XART).

28. The system of claim 27 wherein said XART exists within said system memory.

29. The system of claim 27 wherein said XART exists within local memory, said local memory being used by said at least one communications processor.

30. A computer-readable medium having stored thereon a set of instructions to translate instructions, said set of instructions, which when executed by a processor, cause said processor to perform a method comprising:
 mapping at least one address originating from any of a plurality of programmable devices within a computer system to system memory, said mapping using an Extended Address Re-mapping Table (XART);
 maintaining coherency within at least one CPU cache, said maintaining coherency comprising snooping only addresses not originating from said any of a plurality of programmable devices.

31. The computer-readable medium of claim 30 wherein said any of a plurality of programmable devices are configured as PCI devices.

32. The computer-readable medium of claim 31 wherein said any of a plurality of programmable devices are integrated within the same substrate as said at least one CPU core.

33. The computer-readable medium of claim 32 wherein said any of a plurality of programmable devices are communications processors.

34. The computer-readable medium of claim 33 wherein said XART is located within said portion of system memory.

35. The computer-readable medium of claim 34 wherein said portion of system memory is IA32 host memory.

36. The computer-readable medium of claim 33 wherein said XART is located within local memory, said local memory being used by said communications processor.

37. The computer-readable medium of claim 30 wherein said maintaining coherency within said at least one CPU cache comprises:

snooping memory access bus cycles originating from bus agents other than said any of a plurality of programmable devices, said snooping being performed by a CPU.

\* \* \* \* \*